United States Patent
Li et al.

(10) Patent No.: US 12,296,805 B2
(45) Date of Patent: May 13, 2025

(54) AUTOMATIC PARKING BRAKE ACTUATION AND FAILURE DETECTION

(71) Applicant: TuSimple, Inc., San Diego, CA (US)

(72) Inventors: Zongzheng Li, Tucson, AZ (US); Haimo Bi, Tucson, AZ (US); Xiaoling Han, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 37 days.

(21) Appl. No.: 18/484,042

(22) Filed: Oct. 10, 2023

(65) Prior Publication Data

US 2024/0123954 A1 Apr. 18, 2024

Related U.S. Application Data (60) Provisional application No. 63/416,397, filed on Oct. 14, 2022.

(51) Int. Cl.
*B60T 8/17* (2006.01)
*B60T 7/12* (2006.01)
*B60T 17/22* (2006.01)

(52) U.S. Cl.
CPC .............. *B60T 8/1701* (2013.01); *B60T 7/12* (2013.01); *B60T 17/221* (2013.01); *B60T 2201/10* (2013.01)

(58) Field of Classification Search
CPC ........ B60T 8/1701; B60T 7/12; B60T 17/221; B60T 2201/10; B60T 17/22; B60W 60/001
See application file for complete search history.

(56) References Cited

U.S. PATENT DOCUMENTS

| 12,179,734 B2 * | 12/2024 | Yuan ..................... B60T 8/885 |
| 2019/0176789 A1 | 6/2019 | Frenzel et al. |
| 2019/0217831 A1 * | 7/2019 | Viele ..................... B60D 1/245 |

(Continued)

FOREIGN PATENT DOCUMENTS

| DE | 102021103478 A1 | 8/2022 | |
| KR | 102306474 B1 | 9/2021 | |
| WO | WO-2022171480 A1 * | 8/2022 | ............ B60T 13/385 |

OTHER PUBLICATIONS

European Patent Office, Extended European Search Report for EP Appl. No. 23197768.7, mailed on Feb. 19, 2024, 8 pages.

*Primary Examiner* — Joseph J Dallo
(74) *Attorney, Agent, or Firm* — Perkins Coie LLP (57) ABSTRACT

Embodiments are disclosed for improving safety with parking brake actuation. In particular, embodiments inhibit or allow parking brake commands based on an operation state of a vehicle. Further, embodiments act on parking brake commands based on a health or condition of the parking brakes themselves. An example method for autonomous operation of a vehicle includes receiving a command to apply a parking brake of the vehicle; determining a vehicle operation state based on comparing a speed of the vehicle to a range of pre-determined values; configuring an instruction for engagement of the parking brake according to the vehicle operation state; determining a brake health of the parking brake; and transmitting the instruction to the parking brake to cause the parking brake to be engaged based on the brake health satisfying one or more thresholds.

20 Claims, 3 Drawing Sheets (56) References Cited

U.S. PATENT DOCUMENTS

| | | |
|---|---|---|
| 2019/0315321 A1 | 10/2019 | Lee |
| 2020/0293034 A1* | 9/2020 | Shibata ............... G01M 17/007 |
| 2020/0324792 A1 | 10/2020 | Kunihiro et al. |
| 2021/0155217 A1 | 5/2021 | Hayes et al. |
| 2022/0297648 A1* | 9/2022 | Jalaliyazdi .............. B60T 8/171 |
| 2022/0365030 A1* | 11/2022 | Batra ....................... B60T 8/175 |
| 2024/0075918 A1* | 3/2024 | van Thiel ................ B60T 13/36 |
| 2024/0101079 A1* | 3/2024 | Yuan ....................... B60T 8/885 |
| 2024/0101081 A1* | 3/2024 | Yuan ................. B60W 60/0015 |
| 2024/0101087 A1* | 3/2024 | Yuan ....................... B60T 8/885 |
| 2024/0123954 A1* | 4/2024 | Li ......................... B60T 17/221 |
| 2024/0208475 A1* | 6/2024 | Buchert ............... B60T 8/1708 |

* cited by examiner

AUTOMATIC PARKING BRAKE ACTUATION AND FAILURE DETECTION

CROSS-REFERENCE TO RELATED APPLICATIONS

This patent application claims priority to and the benefit of U.S. Provisional Application No. 63/416,397, filed on Oct. 14, 2022. The aforementioned application of which is incorporated herein by reference in its entirety.

TECHNICAL FIELD

This document relates to braking handling and operation for an autonomous vehicle.

BACKGROUND

Parking brakes of a vehicle are used to secure the vehicle in a stopped or stationary position and to significantly prevent vehicle travel. However, unintentional engagement of parking brakes while a vehicle is in motion can cause a dramatic deceleration, loss of control, and damage to the vehicle and the parking brakes themselves. With autonomous control of vehicles, unintentional parking brake engagement can arise with corrupted or failed autonomous controllers or erroneous sensor data. Human operators can also accidentally cause parking brake engagement while a vehicle is in motion. A need exists to improve safety of operation of vehicle parking brakes and braking subsystems.

SUMMARY

This patent document discloses example embodiments for providing safe parking brake actuation, for example, during autonomous operation of a vehicle. Example embodiments include determination and use of vehicle operation states to inhibit or allow parking brake engagement commands. Example embodiments further consider parking brake health or trustworthiness before executing parking brake engagement, and in example embodiments, alternative and redundant braking subsystems can be recruited for use. Thus, parking brake failure is detected before the parking brakes are engaged. With example embodiments described herein, safety of parking brake usage during vehicle operation is improved, and a likelihood that parking brakes of a vehicle are dangerously engaged while the vehicle is motion is reduced.

In one exemplary aspect of the present disclosure, a method for autonomous operation of a vehicle is disclosed. The method includes receiving, from an autonomous controller of the vehicle, a command to apply a parking brake of the vehicle. The method further includes determining a vehicle operation state based on comparing a speed of the vehicle to a range of pre-determined values. The speed of the vehicle is obtained from a first set of sensors of the vehicle. The method further includes determining a brake health of the parking brake. The method further includes transmitting, based on the brake health satisfying one or more thresholds, transmitting the instruction to the parking brake to cause the parking brake to be engaged.

In another exemplary aspect, a system for autonomous operation of a vehicle is disclosed. The system includes a command inhibiting module and a health monitoring module. The command inhibiting module is configured to receive, from an upstream module of the system, a command to apply a parking brake of the vehicle, determine a vehicle operation state based on comparing a speed of the vehicle to a range of pre-determined values, and based on the vehicle operation state being a stationary state, forward the command to the health monitoring module of the system. The health monitoring module of the system is configured to determine a brake health of the parking brake, and based on the brake health satisfying one or more thresholds, transmit an instruction to the parking brake to cause the parking brake to be engaged.

In yet another exemplary aspect, an autonomous truck is disclosed. The autonomous truck includes a first set of brakes, a second set of brakes, and a braking controller. The braking controller is configured to receive a command to apply the first set of brakes of the autonomous truck. The braking controller is further configured to determine a speed of the autonomous truck based on obtaining a plurality of sensor signals from a set of sensors on the autonomous truck. The braking controller is further configured to determine a brake health of the first set of brakes. The braking controller is further configured to, based on (i) the speed of the autonomous truck being within a range of pre-determined values and (ii) the brake health failing to satisfy one or more thresholds, transmit an instruction to the second set of brakes to cause the second set of brakes to be engaged.

In yet another exemplary aspect, the methods described herein are embodied in the form of processor-executable code and stored in a non-transitory computer-readable storage medium. The code included in the computer readable storage medium when executed by a processor, causes the processor to implement the methods described in this patent document.

In yet another exemplary embodiment, a device, system, or apparatus that is configured or operable to perform the methods described herein is disclosed.

The above and other aspects and their implementations are described in greater detail in the drawings, the descriptions, and the claims.

DETAILED DESCRIPTION

Technical challenges related to autonomous operation of vehicles and parking brakes thereof are addressed in example embodiments disclosed herein. In existing technologies, parking brakes can be accidentally, unintentionally, or maliciously engaged while a vehicle is in motion to cause damage to the vehicle, the parking brakes, goods within the vehicle, and human operators within the vehicle. Additionally, in existing technologies, parking brake engagement may be ineffective due to degradation and failure of the parking brakes.

Thus, for autonomous operation and control of vehicles to be implemented, improper engagement of parking brakes while a vehicle is in motion and while the parking brakes are defective needs to be prevented. Embodiments disclosed herein provide technical solutions over existing technologies for providing safe and reliable operation of parking brakes in autonomous vehicles. For instance, embodiments disclosed herein reduce both a likelihood that parking brakes are engaged while a vehicle is not stationary and a likelihood that parking brakes fail to effectively secure the vehicle in a stationary position. Thus, embodiments disclosed herein provide robust safeguards for parking brake operation based on overall vehicle states related to motion of the entire vehicle and based on parking brake health.

Figure 1:
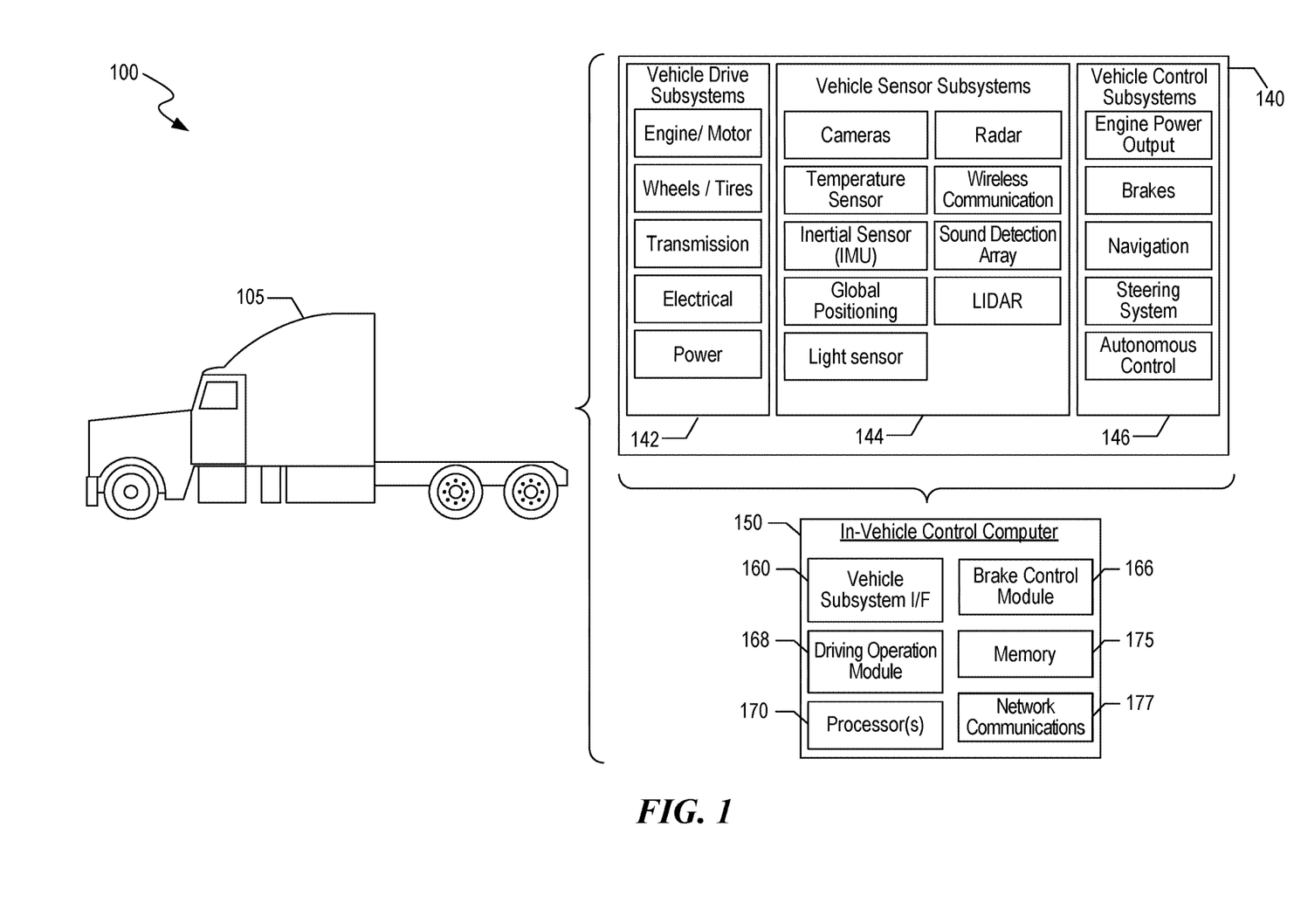
FIG. 1 shows a block diagram of an example vehicle ecosystem in which improvements to parking brake operation during autonomous operation of a vehicle can be implemented.

FIG. 1 shows a block diagram of an example vehicle ecosystem 100 in which example embodiments for improving parking brake operation can be implemented. With the vehicle ecosystem 100, for example, embodiments for determining vehicle operation state, inhibiting or allowing parking brake commands, determining parking brake health, and engaging parking brakes or alternative brakes are implemented for an autonomous vehicle 105. Examples of autonomous vehicle 105 include a car, a truck, or a semi-trailer truck. The vehicle ecosystem 100 includes several systems and subsystems that can generate and/or deliver one or more sources of information/data and related services to the in-vehicle control computer 150 that may be located in an autonomous vehicle 105. The several system and subsystems can be controlled and operated by the in-vehicle control computer 150. The in-vehicle control computer 150 can be in data communication with a plurality of vehicle subsystems 140, all of which can be resident in an autonomous vehicle 105. A vehicle subsystem interface 160 is provided to facilitate data communication between the in-vehicle control computer 150 and the plurality of vehicle subsystems 140. The vehicle subsystem interface 160 can include a wireless transceiver, a Controller Area Network (CAN) transceiver, an Ethernet transceiver, serial ports, gigabit multimedia serial link 2 (GMSL2) ports, local interconnect network (LIN) ports, or any combination thereof.

The autonomous vehicle 105 may include various vehicle subsystems that support the operation of autonomous vehicle 105 and that can be controlled or operated by the in-vehicle control computer 150. The vehicle subsystems may include a vehicle drive subsystem 142, a vehicle sensor subsystem 144, and/or a vehicle control subsystem 146. The vehicle drive subsystem 142 may include components operable to provide powered motion for the autonomous vehicle 105. In some embodiments, the vehicle drive subsystem 142 may include an engine or motor, wheels/tires, a transmission, an electrical subsystem, and a power source (e.g., battery and/or alternator).

The vehicle sensor subsystem 144 may include a number of sensors configured to sense information about an environment or condition of the autonomous vehicle 105. For example, the vehicle sensor subsystem 144 may include an inertial measurement unit (IMU), a Global Positioning System (GPS) transceiver, a RADAR unit, a laser range finder or a light detection and ranging (LiDAR) unit, and/or one or more cameras or image capture devices. The vehicle sensor subsystem 144 may also include sensors configured to monitor internal systems of the autonomous vehicle 105 (e.g., an $O_2$ monitor, a fuel gauge, an engine oil temperature).

In some embodiments, the vehicle sensor subsystem 144 includes sensors that collect signals from which a speed of the autonomous vehicle 105 can be determined. For example, the vehicle sensor subsystem 144 includes sensors configured to collect sensor signals describing a rotational speed of each wheel or tire of the autonomous vehicle 105, sensor signals describing an operation of the vehicle drive subsystem 142 (e.g., rotational speed of a transmission output shaft, rotational speed of engaged gears, engine or motor power consumption), and/or the like.

The IMU may include any combination of sensors (e.g., accelerometers and gyroscopes) configured to sense position and orientation changes of the autonomous vehicle 105 based on inertial acceleration. For example, the IMU is configured to collect sensor signals from which a speed of the autonomous vehicle 105 can be determined. The GPS transceiver may be any sensor configured to estimate a geographic location of the autonomous vehicle 105. For this purpose, the GPS transceiver may include a receiver/transmitter operable to provide information regarding the position of the autonomous vehicle 105 with respect to the Earth. The RADAR unit may represent a system that utilizes radio signals to sense objects within the local environment of the autonomous vehicle 105. In some embodiments, in addition to sensing the objects, the RADAR unit may additionally be configured to sense the speed and the heading of the objects proximate to the autonomous vehicle 105. The laser range finder or LIDAR unit may be any sensor configured to sense objects in the environment in which the autonomous vehicle 105 is located using lasers. The cameras may include one or more devices configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle, one or more brake units or subsystems, a navigation unit, and/or a steering system. The throttle may be configured to control, for instance, the operating speed of the engine and, in turn, control the speed of the autonomous vehicle 105.

In some embodiments, the one or more brake units or subsystems include various brakes configured to slow and/or stop vehicle travel. The brake unit can include any combination of mechanisms configured to decelerate the autonomous vehicle 105. The brake unit can use friction to slow the wheels in a standard manner. For example, the brake units or subsystems may include disc or drum brakes of wheels of the autonomous vehicle 105. In particular, the brake units or subsystems includes parking brakes configured to secure a motionless or stationary state of the autonomous vehicle 105. The parking brakes may be configured for use when the autonomous vehicle is in or near a stationary state, and engagement of the parking brakes while the vehicle is in motion may lead to damage of the parking brakes and other components of the vehicle. In some embodiments, the brake units or subsystems include alternative brake units that may be operated to support the function of the parking brakes in securing a motionless state of the vehicle. For example, the alternative brake units include foundation brakes. In some embodiments, the autonomous vehicle 105 includes at least one primary foundation brake and at least one redundant foundation brake.

The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS transceiver and one or more predetermined maps so as to determine the driving path for the autonomous vehicle 105.

The vehicle control subsystem 146 may be configured to control operation of power distribution units located in the autonomous vehicle 105. The power distribution units have an input that is directly or indirectly electrically connected to the power source of the autonomous vehicle 105 (e.g., alternator). Each power distribution unit can have one or more electrical receptacles or one or more electrical connectors to provide power to one or more devices of the autonomous vehicle 105. For example, various sensors of the vehicle sensor subsystem 144 such as cameras and LiDAR units may receive power from one or more power distribution units. The vehicle control subsystem 146 can also include power controller units, where each power controller unit can communicate with a power distribution unit and provide information about the power distribution unit to the in-vehicle control computer 150, for example.

Many or all of the functions of the autonomous vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the autonomous vehicle 105 in a distributed fashion. For example, the in-vehicle control computer 150 includes a driving operation module 168 and a brake control module 166, in some embodiments. In some embodiments, the brake control module 166 implements techniques described herein to safely engage parking brakes and monitor parking brake health.

The individual components or modules of the in-vehicle control computer 150 may operate and communicate together to cause the autonomous vehicle 105 to operate. The various components and modules of the in-vehicle control computer 150 can each be associated with a domain or functionality. In some examples, components or modules of the in-vehicle control computer 150 feed into and communicate with each other in a hierarchy or order. Outputs of an upstream module of the in-vehicle control computer 150 are inputs to a downstream module of the in-vehicle control computer 150. For example, the driving operation module 168 determines operations to be performed by the vehicle and can provide braking commands to the brake control module 166. In this way, the driving operation module 168 may be upstream of the brake control module 166, as the driving operation module 168 can send commands or provide outputs to be inputs for the brake control module 166. In some embodiments, more than one module or component of the in-vehicle control computer 150 may be upstream of the brake control module 166.

In some embodiments, the data storage device 175 may contain processing instructions (e.g., program logic) executable by the data processor 170 to perform various methods and/or functions of the autonomous vehicle 105, including those described in this patent document. The various components and modules of the in-vehicle control computer 150 can be implemented as software modules in the processing instructions. Thus, in some embodiments, the data storage device 175 includes processing instructions for each of a plurality of modules of the in-vehicle control computer 150.

The data storage device 175 may include instructions to transmit data to, receive data from, interact with, or control one or more of the vehicle drive subsystem 142, the vehicle sensor subsystem 144, and the vehicle control subsystem 146. In some embodiment, additional components or devices can be added to the various subsystems or one or more components or devices (e.g., temperature sensor shown in FIG. 1) can be removed without affecting various embodiments described in this patent document. The in-vehicle control computer 150 can be configured to include a data processor 170 and a data storage device 175.

The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146). For example, the in-vehicle control computer 150 may use input from the vehicle control subsystem 146 in order to control the steering system to avoid a high-speed vehicle detected in image data collected by overlapped cameras of the vehicle sensor subsystem 144, move in a controlled manner, or follow a path or trajectory. As another example, the in-vehicle control computer 150 (or a component or module thereof) may use input from the vehicle sensor subsystem 144 to determine a vehicle speed or a vehicle operation state, which can be used to inhibit or allow parking brake commands.

In some embodiments, the in-vehicle control computer 150 can be operable to provide control over many aspects of the autonomous vehicle 105 and its subsystems. For example, the in-vehicle control computer 150 may transmit instructions or commands to cameras of the vehicle sensor subsystem 144 to collect image data at a specified time, to synchronize image collection rate or frame rate with other cameras or sensors, or the like. Thus, the in-vehicle control computer 150 and other devices, including cameras and sensors, may operate at a universal frequency, in some embodiments. As another example, the in-vehicle control computer 150 (or a component or module thereof) may transmit instructions to brake units of the autonomous vehicle 105 to cause engagement of the brake units to slow the autonomous vehicle, stop the autonomous vehicle, or secure the autonomous vehicle in a stationary position.

In some embodiments, the in-vehicle control computer 150 includes a network communicator 177 which may be configured to communicate with remote computer located outside of the autonomous vehicle 105. For example, the in-vehicle control computer 150, via the network communicator 177, communicates with an oversight system to report instances in which a parking brake is engaged, report instances of evasive maneuvering, receive navigational instructions or commands, and/or the like.

Figure 2:
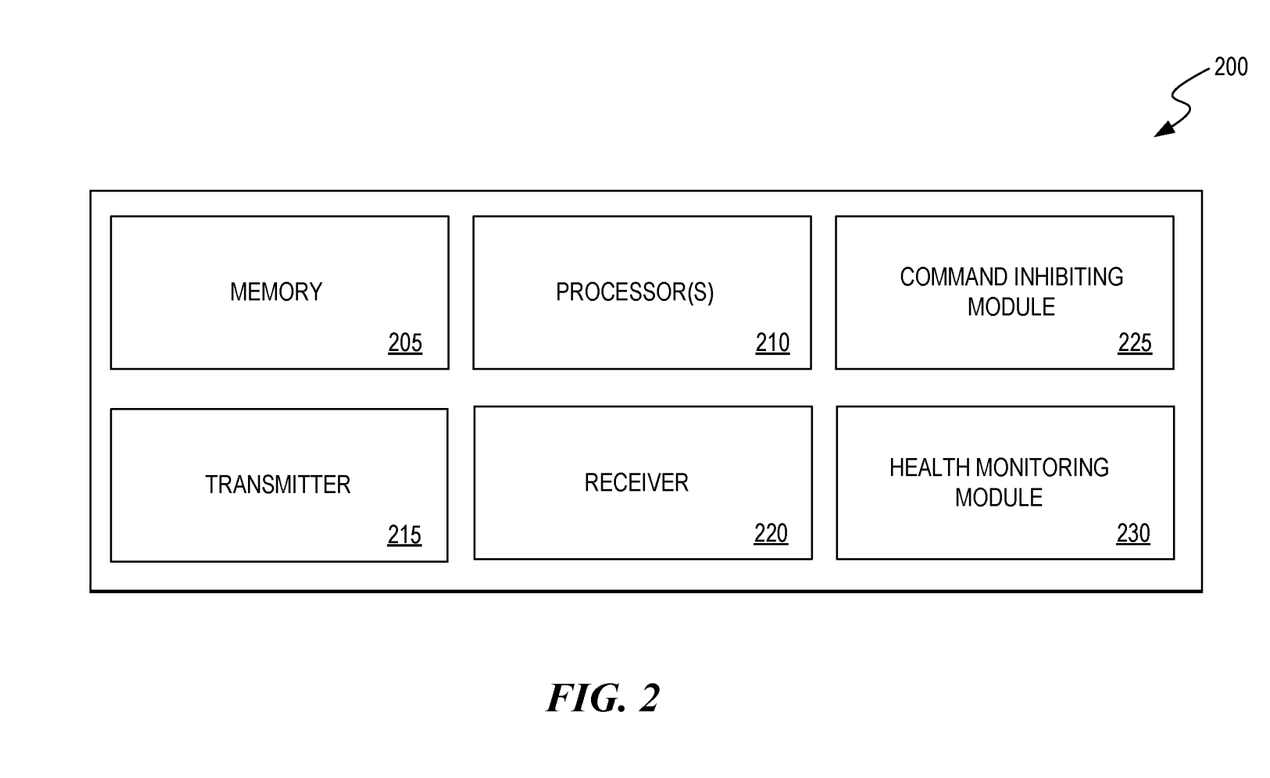
FIG. 2 shows a block diagram of an example computer configured to implement methods described herein for improving parking brake operation of a vehicle, such as during autonomous operation of the vehicle.

Turning now to FIG. 2, an exemplary block diagram of a computing device 200 is illustrated. The computing device 200 may be configured for safely operating parking brakes of a vehicle. In some embodiments, the computing device 200 is embodied by the in-vehicle control computer 150. In some embodiments, the computing device 200 is embodied by an individual component or module of the in-vehicle control computer 150, such as the brake control module 166. In such embodiments, the computing device 200 may receive instructions from upstream components or modules and may transmit instructions to downstream components or modules to cause autonomous operations of the autonomous vehicle 105.

In some embodiments, the computing device 200 is embodied by a brake controller device that is coupled to the in-vehicle control computer 150. For example, the computing device 200 is a brake controller device that is coupled between the in-vehicle control computer 150 and a braking subsystem or brake units of the autonomous vehicle 105. As such, the computing device 200 is configured to process braking commands and instructions from the in-vehicle control computer 150 and to operate brakes of the autonomous vehicle 105.

As illustrated, the computing device 200 includes at least one processor 210 and a memory 205 having instructions stored thereupon. The instructions, upon execution by the processor 210, configure the computing device 200 to perform the example operations related to safe operation (e.g., actuation, engagement) of parking brakes and/or other alternative brake units of the vehicle that are described herein. The transmitter 215 transmits or sends instructions to various components of a vehicle. For example, the transmitter 215 is configured to transmit an instruction to a brake unit of a vehicle to cause the brake unit to engage. The receiver 220 receives information or data from one or more components of subsystems of a vehicle. For example, the receiver 220 receives a parking brake command to apply parking brakes of the vehicle. In some embodiments, the transmitter 215 and the receiver 220 may be used to communicate with other devices located in or outside the vehicle. For example, the transmitter 215 and the receiver 220 are used to communicate with an oversight or remote computer to report parking brake health and alerts thereof, report instances in which parking brakes are used, and/or the like.

The computing device 200 further includes a command inhibiting module 225 and a health monitoring module 230. In some embodiments, the command inhibiting module 225 and the health monitoring module 230 are implemented in software as executable instructions stored by the memory 205 and executed by the processors 210. In some embodiments, the command inhibiting module 225 and the health monitoring module 230 are implemented as hardware components that may include respective processing units and memory units.

In some embodiments, the command inhibiting module 225 is configured to act as a safety net for parking brake commands received by the computing device (e.g., via receiver 220). As discussed, parking brake commands may be erroneously received in instances where a vehicle is in motion. Thus, the command inhibiting module 225 is configured to determine a vehicle operation state and to provide an inhibit command based on the vehicle operation state.

In some embodiments, the vehicle operation state is determined by the command inhibiting module 225 based on whether or not the vehicle is in motion. If the vehicle operation state indicates that the vehicle is in a motionless state, then the inhibit command may be set to false. Accordingly, a received parking brake command may be honored, and parking brake engagement is allowed due to the vehicle being in a motionless state. If the vehicle operation state indicates that the vehicle is in motion, then the inhibit command may be set to true. Accordingly, a received parking brake command may be rejected, and parking brake engagement is inhibited due to the vehicle being in motion.

In some embodiments, the command inhibiting module 225 is configured to continuously (e.g., periodically) set the inhibit command based on a determined operation state. As such, upon receipt of a parking brake command, the inhibit command set by the command inhibiting module 225 can allow or reject the parking brake command.

In some embodiments, the health monitoring module 230 acts as another safety net for parking brake actuation or engagement. In some embodiments, the health monitoring module 230 is implemented downstream of the command inhibiting module 225. For example, upon allowing a parking brake command, the command inhibiting module 225 forwards the parking brake command to the health monitoring module 230, which may act on the parking brake command according to whether the health monitoring module 230 determines the parking brakes as healthy.

In some embodiments, the health monitoring module 230 is configured to monitor usage and health of parking brakes of a vehicle. If a parking brake health is determined to be satisfactory by the health monitoring module 230, the health monitoring module 230 transmits instructions to the parking brakes to cause the parking brakes to be engaged. If a parking brake health is determined to unsatisfactory by the health monitoring module 230, the health monitoring module 230 transmits instructions to an alternative brake unit to cause the alternative brake unit to be engaged. For example, the alternative brake unit includes primary and redundant foundation brakes.

Thus, the computing device 200 includes a command inhibiting module 225 and a health monitoring module 230 to safely operate parking brakes of a vehicle based on a vehicle operation state and parking brake health. With both a determination of vehicle operation state and a determination of a parking brake health, single point failure of parking brakes of a vehicle can be avoided.

Figure 3:
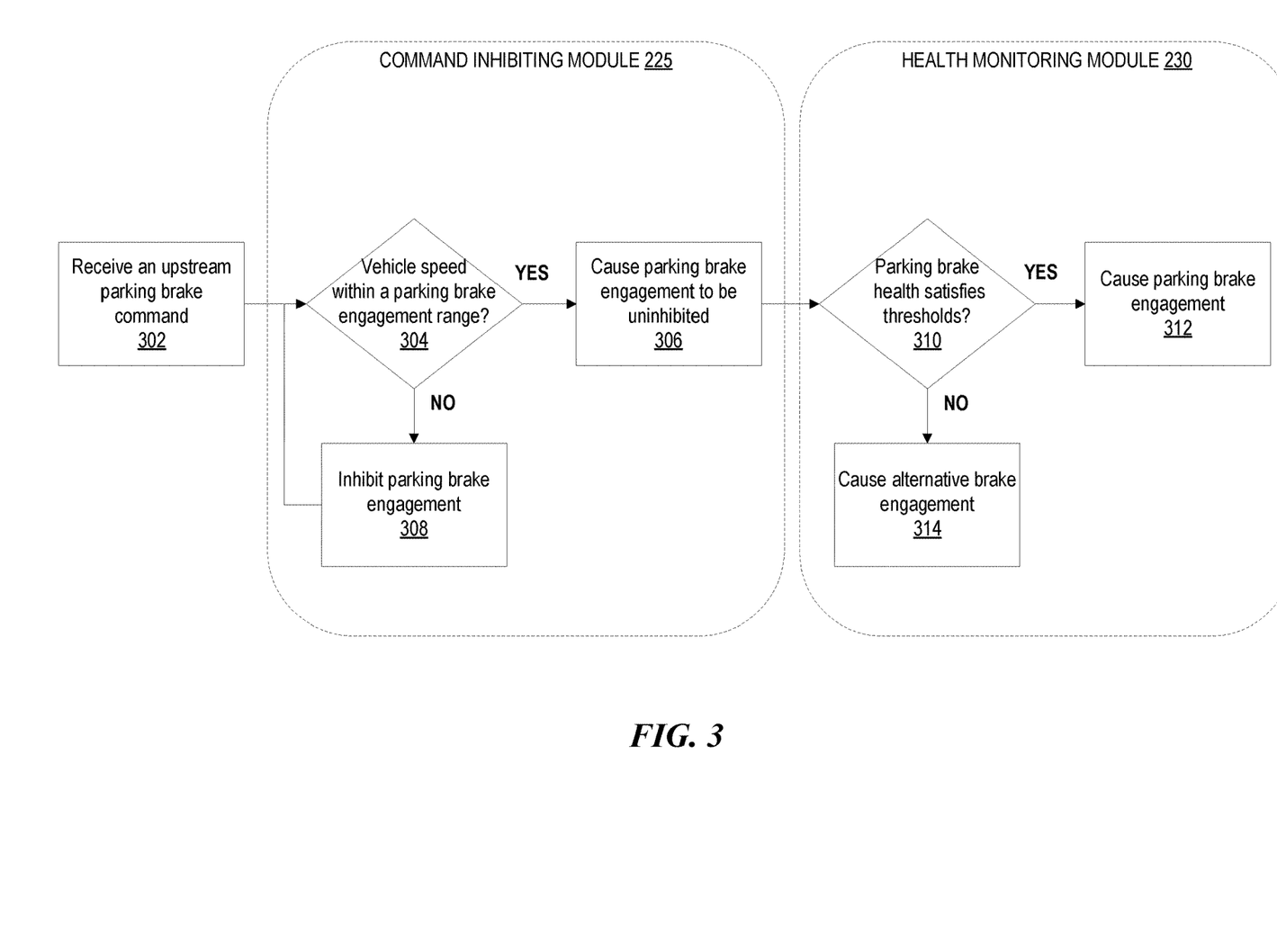
FIG. 3 shows an example flow diagram to improve parking brake operation for a vehicle during autonomous operation of the vehicle.

Turning now to FIG. 3, a flow diagram of a method implemented to improve safety of parking brake actuation and engagement in a vehicle is illustrated. Example operations of the method may be performed by the computing device 200, which may be embodied by the in-vehicle control computer 150 or components or modules thereof. As shown, some of the example operations may be performed by the command inhibiting module 225 and the health monitoring module 230 of the computing device 200.

At an operation 302, an upstream parking brake command is received. The upstream parking brake command is a command to apply parking brakes of the vehicle. In some embodiments, the upstream parking brake command is received from an autonomous controller of a vehicle, such as an in-vehicle control computer 150 or a component or module thereof. In some embodiments, the upstream parking brake command is received based on an upstream autonomous controller determining that a condition is satisfied. For example, the upstream parking brake command is received based on an upstream autonomous controller determining that the vehicle has reached a destination. As another example, the upstream parking brake command is received based on an upstream autonomous controller determining that the vehicle is stopped at a location having a significant gradient. In some embodiments, the command is received via an electronic communication channel with the upstream autonomous controller (e.g., a CAN bus or interface).

As discussed, in some instances, the upstream parking brake command may be received in error. For example, the upstream autonomous controller may erroneously determine that the vehicle is stopped, when in reality the vehicle is in motion. As another example, data received from the upstream autonomous controller may be corrupted such that the data is interpreted as a command to apply parking brakes of the vehicle. As yet another example, the parking brake command is received based on an accidental or malicious indication from a human operator for parking brakes to be applied.

At an operation 304, the command inhibiting module 225 determines whether a vehicle speed is within a parking brake engagement range. In some embodiments, the parking brake engagement range is a range of pre-determined speed values indicative of the vehicle being in motion or not. In some embodiments, the parking brake engagement range accounts for delays in measuring vehicle speed and sensor errors. For example, the vehicle may be decelerating and nearing a motionless state while the vehicle speed is measured as a value above zero. In some embodiments, the parking brake engagement range is based on speeds at which parking brake engagement is permitted. For example, a parking brake can be engaged with relative safety as the vehicle is traveling at a near-zero speed, such as less than 1 mile per hour, less than 2 miles per hour, less than 5 miles per hour.

According to some examples, the parking brake engagement range may span between 0 miles per hour and 2 miles per hour, between 0 miles per hour and 1 mile per hour, between 0.1 miles per hour and 1 mile per hour, or between 0.25 miles per hour and 1 mile per hour.

Thus, operation 304 is performed to determine a vehicle operation state based on comparing a vehicle speed to a range of pre-determined values. In some embodiments, the command inhibiting module 225 determines the vehicle speed based on a plurality of sensor signals received from a set of sensors of the vehicle (e.g., included in the vehicle sensor subsystem 144). For example, a plurality of signals obtained from a set of sensors of the vehicle describe rotational speed of each wheel, rotational speed of a transmission output shaft, a speed value in a command transmitted to the vehicle drive subsystem 142, IMU and/or gyroscopic measurements, GPS location estimates, a gas pedal percentage, and/or the like. In some examples, the plurality of sensor signals are aggregated (e.g., weighted, averaged, filtered, etc.) to determine a speed value for the vehicle that can be compared to a range of pre-determined values. By determining a vehicle speed from multiple sensor sources, a single point failure of vehicle speed determination can be avoided. As a further example, the vehicle operation state is determined based on whether a transmission gear is engaged or not.

Thus, in some embodiments, the vehicle operation state describes whether the vehicle is stationary or not, or generally whether parking brake engagement is permitted or not. In some embodiments, the vehicle operation state can indicate further conditions related to whether parking brake engagement is permitted or not. For example, the vehicle operation state indicates a gradient of the surface on which the vehicle is located. In some examples, parking brake engagement is not permitted on significant gradients (e.g., greater than 10 degrees, greater than 15 degrees, greater than 20 degrees). As another example, the vehicle operation state indicates a wetness of the surface based on weather conditions such as rain. As such, in some embodiments, the vehicle operation state is further determined based on environmental conditions such as surface gradient and surface conditions.

If the vehicle operation state is determined to be motionless at operation 304 (e.g., vehicle speed is within a range of pre-determined values), operation 306 is performed. At operation 306, the command inhibiting module 225 causes the upstream parking brake command to be allowed or uninhibited. Thus, at operation 306, the command inhibiting module 225 causes parking brake engagement to be allowed or uninhibited.

If the vehicle operation state is determined to be in motion at operation 304 (e.g., vehicle speed is outside a range of pre-determined values), operation 308 may be performed. At operation 308, the command inhibiting module 225 causes the upstream parking brake command to be inhibited. Thus, at operation 308, the command inhibiting module 225 inhibits parking brake engagement.

In some embodiments, the inhibition of parking brake engagement is indicated to an operator of the vehicle, such as a human operator located within the vehicle or a remote operator outside of the vehicle. For example, an indication that parking brake engagement is inhibited is provided via a display device located in the vehicle. As discussed, the inhibition of parking brake engagement may be implemented as an inhibit command or instruction that causes received parking brake commands to be rejected.

Following operation 306, the parking brake command is forwarded to the health monitoring module 230. In some embodiments, an instruction to engage the parking brake is sent to the health monitoring module 230. Thus, based on the vehicle operation state being determined to be motionless, a determination is then made relating to the health, trustworthiness, or working condition of the parking brakes.

At operation 310, the health monitoring module 230 determines whether the parking brake health satisfies one or more thresholds. Thus, at operation 310, the health monitoring module 230 determines whether the parking brakes are healthy enough to be engaged in response to the upstream parking brake command.

In some embodiments, the parking brake health includes a usage counter that indicates a number of instances that the parking brakes have been engaged. In some embodiments, the usage counter indicates a total length of time that the parking brakes have been engaged. The usage counter may be compared against a counter threshold that indicates a maximum number of instances or a maximum length of time that the parking brake engagement is permitted. The counter threshold is satisfies based on the usage counter being less than or equal to the counter threshold.

In some embodiments, the parking brake health includes a response delay for the parking brakes. For example, a delay in time between when a communication (e.g., a ping) is transmitted to the parking brakes (e.g., via a CAN bus or interface) and when a response is received from the parking brakes is measured. The response delay being longer than a pre-determined threshold may be suggestive of a fault at the parking brake, and thus, in some embodiments, the response delay is compared against a pre-determined threshold at operation 310. The pre-determined threshold, or delay threshold, is satisfied based on the response delay being less than or equal to the delay threshold.

If the parking brake health is determined to be satisfactory at operation 310, operation 312 may be performed. At operation 312, the health monitoring module 230 causes parking brake engagement. In some embodiments, instructions are transmitted to the parking brakes to cause the parking brakes to engage. In some embodiments, the usage counter of the parking brakes is updated. For example, the usage counter can be incremented, or a length of time that the parking brakes are engaged is added to the usage counter.

If the parking brake health is determined to be unsatisfactory at operation 310, operation 314 may be performed. At operation 314, the health monitoring module 230 causes engagement of an alternative brake unit. In some embodiments, instructions are transmitted to the alternative brake unit to cause the alternative brake unit to engage.

In some embodiments, the alternative brake unit includes a primary foundation or air brake and a redundant foundation or air brake. In some embodiments, the redundant foundation brake is associated with a holding time limitation. For example, the redundant foundation brake may be engaged for only a pre-determined length of time.

Thus, with operations relating to vehicle operation state and parking brake health being performed, parking brakes of a vehicle are safely operated. In some embodiments, operations for determining vehicle operation state and operations for determining parking brake health can be performed in parallel and independent of each other. In some embodiments, operations for determining vehicle operation state and operations for determining parking brake health are performed independent of receiving an upstream parking brake command such that, when an upstream parking brake command is received, a vehicle operation state and a parking brake health have been determined. In some embodiments, operations for determining parking brake health are performed at a greater or equal frequency than operations for determining vehicle operation state. As such, if a parking brake command is allowed based on a vehicle operation state, a parking brake health has already been determined.

The following technical solutions may be implemented by some preferred embodiments.

1. A method for autonomous operation of a vehicle, comprising: receiving, by a braking controller of the vehicle from an autonomous controller of the vehicle, a command to apply a parking brake of the vehicle; determining, by the braking controller, a vehicle operation state based on comparing a speed of the vehicle to a range of pre-determined values, wherein the speed of the vehicle is obtained from a first set of sensors of the vehicle; according to the vehicle operation state being determined to be a stationary state, determining, by the braking controller, a brake health of the parking brake; and based on the brake health satisfying one or more thresholds, transmitting, by the braking controller, an instruction to the parking brake to cause the parking brake to be engaged.

2. The method of solution 1, further comprising: receiving, by the braking controller from the autonomous controller, a second command to apply the parking brake; determining, by the braking controller, a second vehicle operation state based on comparing a second speed of the vehicle to the range of pre-determined values; and according to the second vehicle operation state being determined to be a transient state, causing the second command to be inhibited from the parking brake.

3. The method of solutions 1-2, wherein the brake health includes a usage counter that indicates a number of instances that the parking brake has been engaged, and wherein the one or more thresholds includes a counter threshold that is satisfied based on the usage counter being less than the counter threshold.

4. The method of solutions 1-3, wherein the brake health includes a response delay of the parking brake, and wherein the one or more thresholds includes a delay threshold that is satisfied based on the response delay being less than the delay threshold.

5. The method of solutions 1-4, further comprising: determining a second brake health of the parking brake; and based on the second brake health not satisfying the one or more thresholds, transmitting, by the braking controller, a second instruction to an alternative brake unit of the vehicle, wherein the second instruction is configured to cause the alternative brake unit to be engaged.

6. The method of solution 5, wherein the alternative brake unit includes a primary foundation brake and a redundant foundation brake.

7. The method of solutions 1-6, wherein the command is received by the braking controller from the autonomous controller via an electronic communication channel between the braking controller and the autonomous controller.

8. The method of solutions 1-7, wherein the determining of the brake health is performed independent of receiving the command to apply the parking brake.

9. A system for autonomous operation of a vehicle, the system comprising: a command inhibiting module configured to: receive, from an upstream module of the system, a command to apply a parking brake of the vehicle, determine a vehicle operation state based on comparing a speed of the vehicle to a range of pre-determined values, and based on the vehicle operation state being determined to be a stationary state, forward the command to a health monitoring module of the system; and the health monitoring module configured to: determine a brake health of the parking brake, and based on the brake health satisfying one or more thresholds, transmit an instruction to the parking brake to cause the parking brake to be engaged.

10. The system of solution 9, wherein the command inhibiting module is further configured to, based on a particular vehicle operation state, inhibit the command to apply the parking brake.

11. The system of solutions 9-10, wherein the health monitoring module is further configured to, based on the brake health failing to satisfy the one or more thresholds, transmit an instruction to an alternative brake unit of the vehicle to cause the alternative brake unit to be engaged, and wherein the alternative brake unit includes a primary foundation brake and a redundant foundation brake.

12. The system of solutions 9-11, wherein the brake health is determined by the health monitoring module based on a usage counter that indicates a number of instances that the parking brake has been engaged.

13. The system of solutions 9-12, wherein the brake health is determined by the health monitoring module based on a response delay of the parking brake.

14. The system of solutions 9-13, wherein the health monitoring module is configured to determine the brake health of the parking brake at a first frequency that is greater than or equal to a second frequency at which the command inhibiting module determines the vehicle operation state.

15. The system of solutions 9-14, wherein the command inhibiting module is configured to obtain a plurality of sensor signals from a set of sensors that describe a rotational speed of each wheel of the vehicle and a rotational speed of a transmission output shaft of the vehicle, wherein the speed of the vehicle is determined from the plurality of sensor signals.

16. An autonomous truck, comprising: a first set of brakes; a second set of brakes; and a braking controller that is configured to: receive a command to apply the first set of brakes of the autonomous truck; determine a speed of the autonomous truck based on obtaining a plurality of sensor signals from a set of sensors on the autonomous truck; determine a brake health of the first set of brakes; and based on (i) the speed of the autonomous truck being within a range of pre-determined values and (ii) the brake health failing to satisfy one or more thresholds, transmit an instruction to the second set of brakes to cause the second set of brakes to be engaged.

17. The autonomous truck of solution 16, wherein the braking controller is further configured to: transmit an instruction to the first set of brakes based on (i) the speed of the autonomous truck being within the range of pre-determined values and (ii) the brake health satisfying the one or more thresholds.

18. The autonomous truck of solutions 16-17, wherein the braking controller is further configured to: inhibit the command based on the speed of the autonomous truck being outside of the range of pre-determined values.

19. The autonomous truck of solution 18, further comprising a display via which an inhibition of the command is indicated to an operator for the truck.

20. The autonomous truck of solutions 16-19, wherein the braking controller is configured to determine the brake health of the first set of brakes based on a usage counter that indicates a number of instances that the first set of brakes has been engaged.

21. The autonomous truck of solutions 16-20, wherein the braking controller is configured to determine the brake health of the first set of brakes based on a response delay of the first set of brakes.

22. The autonomous truck of solutions 16-21, wherein the first set of brakes includes parking brakes, and wherein the second set of brakes includes a primary foundation brake and a redundant foundation brake.

23. A non-transitory computer-readable program storage medium having code stored thereon, the code, when executed by a processor, causing the processor to implement a method of any of solutions 1-8.

24. A system comprising a processor and a memory storing instructions executable by the processor to cause the system to implement a method of any of solutions 1-8.

In this document the term "exemplary" is used to mean "an example of" and, unless otherwise stated, does not imply an ideal or a preferred embodiment. In this document, the term "microcontroller" can include a processor and its associated memory.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

The invention claimed is:

1. A vehicle configured for autonomous operation, comprising:
   a first set of brakes;
   a second set of brakes; and
   a braking controller comprising at least one processor and a memory storing instructions that, when executed by the at least one processor, cause the braking controller to implement a method comprising:
   receiving, from an autonomous controller of the vehicle, a command to apply the first set of brakes of the vehicle;
   determining a vehicle operation state of the vehicle based on comparing a speed of the vehicle that is determined via a plurality of sensor signals from a set of sensors on the vehicle with a range of pre-determined values;
   in response to the vehicle operation state being a stationary state, determining a brake health of the first set of brakes; and
   based on the brake health failing to satisfy one or more thresholds, transmit an instruction to the second set of brakes to cause the second set of brakes to be engaged instead of the first set of brakes specified by the received command.

2. The vehicle of claim 1, wherein the method implemented by the braking controller further comprises:
   receiving, from the autonomous controller, a second command to apply the first set of brakes;
   determining a second vehicle operation state based on comparing a second speed of the vehicle to the range of pre-determined values, the second speed corresponding to a time associated with receiving the second command; and
   according to the second vehicle operation state being determined to be a transient state, causing the second command to be inhibited such that the second set of brakes are engaged instead of the first set of brakes.

3. The vehicle of claim 1, wherein the brake health includes a usage counter that indicates a number of instances that the first set of brakes has been engaged, and wherein the one or more thresholds includes a counter threshold that is satisfied based on the usage counter being less than the counter threshold.

4. The vehicle of claim 1, wherein the brake health includes a response delay of the first set of brakes, and wherein the one or more thresholds includes a delay threshold that is satisfied based on the response delay being less than the delay threshold.

5. The vehicle of claim 1, wherein the first set of brakes includes a parking brake, and wherein the second set of brakes includes a primary foundation brake and a redundant foundation brake.

6. The vehicle of claim 1, wherein the command is received by the braking controller from the autonomous controller via an electronic communication channel between the braking controller and the autonomous controller.

7. The vehicle of claim 1, wherein the determining of the brake health is performed independent of receiving the command to apply the parking brake.

8. A system for autonomous operation of a vehicle, the system comprising:
   (i) a command inhibiting module configured to:
   receive, from an upstream module of the system, a command to apply a parking brake of the vehicle,
   determine a vehicle operation state based on comparing a speed of the vehicle to a range of pre-determined values, and
   based on the vehicle operation state being determined to be a stationary state, forward the command to a health monitoring module of the system; and
   (ii) the health monitoring module configured to:
   determine a brake health of the parking brake, and
   based on the brake health satisfying one or more thresholds, transmit an instruction to the parking brake to cause the parking brake to be engaged.

9. The system of claim 8, wherein the command inhibiting module is further configured to, based on a particular vehicle operation state, inhibit the command to apply the parking brake.

10. The system of claim 8, wherein the health monitoring module is further configured to, based on the brake health failing to satisfy the one or more thresholds, transmit an instruction to an alternative brake unit of the vehicle to cause the alternative brake unit to be engaged, and wherein the alternative brake unit includes a primary foundation brake and a redundant foundation brake.

11. The system of claim 8, wherein the brake health is determined by the health monitoring module based on a usage counter that indicates a number of instances that the parking brake has been engaged.

12. The system of claim 8, wherein the brake health is determined by the health monitoring module based on a response delay of the parking brake.

13. The system of claim 8, wherein the health monitoring module is configured to determine the brake health of the parking brake at a first frequency that is greater than or equal to a second frequency at which the command inhibiting module determines the vehicle operation state.

14. The system of claim 8, wherein the command inhibiting module is configured to obtain a plurality of sensor signals from a set of sensors that describe a rotational speed of each wheel of the vehicle and a rotational speed of a transmission output shaft of the vehicle, wherein the speed of the vehicle is determined from the plurality of sensor signals.

15. A method for autonomous operation of a vehicle, comprising:
   receiving, by a braking controller of the vehicle from an autonomous controller of the vehicle, a command to apply a parking brake of the vehicle;
   determining, by the braking controller, a vehicle operation state based on comparing a speed of the vehicle to a range of pre-determined values, wherein the speed of the vehicle is obtained from a first set of sensors of the vehicle;
   according to the vehicle operation state being determined to be a stationary state, determining, by the braking controller, a brake health of the parking brake; and
   based on the brake health satisfying one or more thresholds, transmitting, by the braking controller, an instruction to the parking brake to cause the parking brake to be engaged.

16. The method of claim 15, further comprising:
   receiving, from the autonomous controller of the vehicle, a second command to apply the parking brake of the vehicle; and
   inhibiting the second command such that an alternative set of brakes are engaged instead of the parking brake, based on the speed of the autonomous truck being outside of the range of pre-determined values.

17. The method of claim 16, further comprising:
   indicating an inhibition of the second command to an operator of the vehicle via a display located on the vehicle.

18. The method of claim 16, wherein the alternative set of brakes includes a primary foundation brake and a redundant foundation brake.

19. The method of claim 15, wherein the braking controller determines the brake health of the parking brake based on a usage counter that indicates a number of instances that the parking brake has been engaged.

20. The method of claim 15, wherein the braking controller determines the brake health of the parking brake based on a response delay of the parking brake.

* * * * *